United States Patent
Song

(10) Patent No.: US 8,472,321 B2
(45) Date of Patent: Jun. 25, 2013

(54) METHOD FOR MANAGING DATA TRANSFER SERVICES ON A NETWORK

(75) Inventor: Yu Kyoung Song, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 489 days.

(21) Appl. No.: 12/298,505

(22) PCT Filed: Apr. 26, 2007

(86) PCT No.: PCT/KR2007/002043
§ 371 (c)(1),
(2), (4) Date: Jun. 5, 2009

(87) PCT Pub. No.: WO2007/123381
PCT Pub. Date: Nov. 1, 2007

(65) Prior Publication Data
US 2009/0323721 A1    Dec. 31, 2009

Related U.S. Application Data

(60) Provisional application No. 60/795,524, filed on Apr. 26, 2006.

(51) Int. Cl.
*G01R 31/08* (2006.01)
*H04B 7/212* (2006.01)

(52) U.S. Cl.
USPC .......................................... 370/232; 370/444

(58) Field of Classification Search
None
See application file for complete search history.

(56) References Cited

U.S. PATENT DOCUMENTS

| | | | |
|---|---|---|---|
| 6,262,974 B1 * | 7/2001 | Chevalier et al. | 370/232 |
| 7,254,141 B1 * | 8/2007 | Desai et al. | 370/468 |
| 2003/0152029 A1 * | 8/2003 | Couturier | 370/235 |
| 2007/0022396 A1 * | 1/2007 | Attar et al. | 716/5 |

OTHER PUBLICATIONS

UPnP Forum, UPnP QoS Architecture: 1.0, Mar. 10, 2005, Daryl Hlasny, et al.*

* cited by examiner

*Primary Examiner* — Jutai Kao
(74) *Attorney, Agent, or Firm* — Lee, Hong, Degerman, Kang & Waimey

(57) ABSTRACT

The present invention relates to a method for managing traffic transfer services on a network. One of the present methods determines priority reference ensuring to retrieve bandwidth greater than necessary bandwidth, if current available bandwidth is not sufficient for a new connection, and selected selects a combination of in-service connections whose priority is not higher than the determined priority reference such that the selected combination is able to return the necessary bandwidth and the number of connections in the selected combination is smallest as well. The connections pertaining to the selected combination are pre-empted to permit access of the new connection to the network.

8 Claims, 7 Drawing Sheets

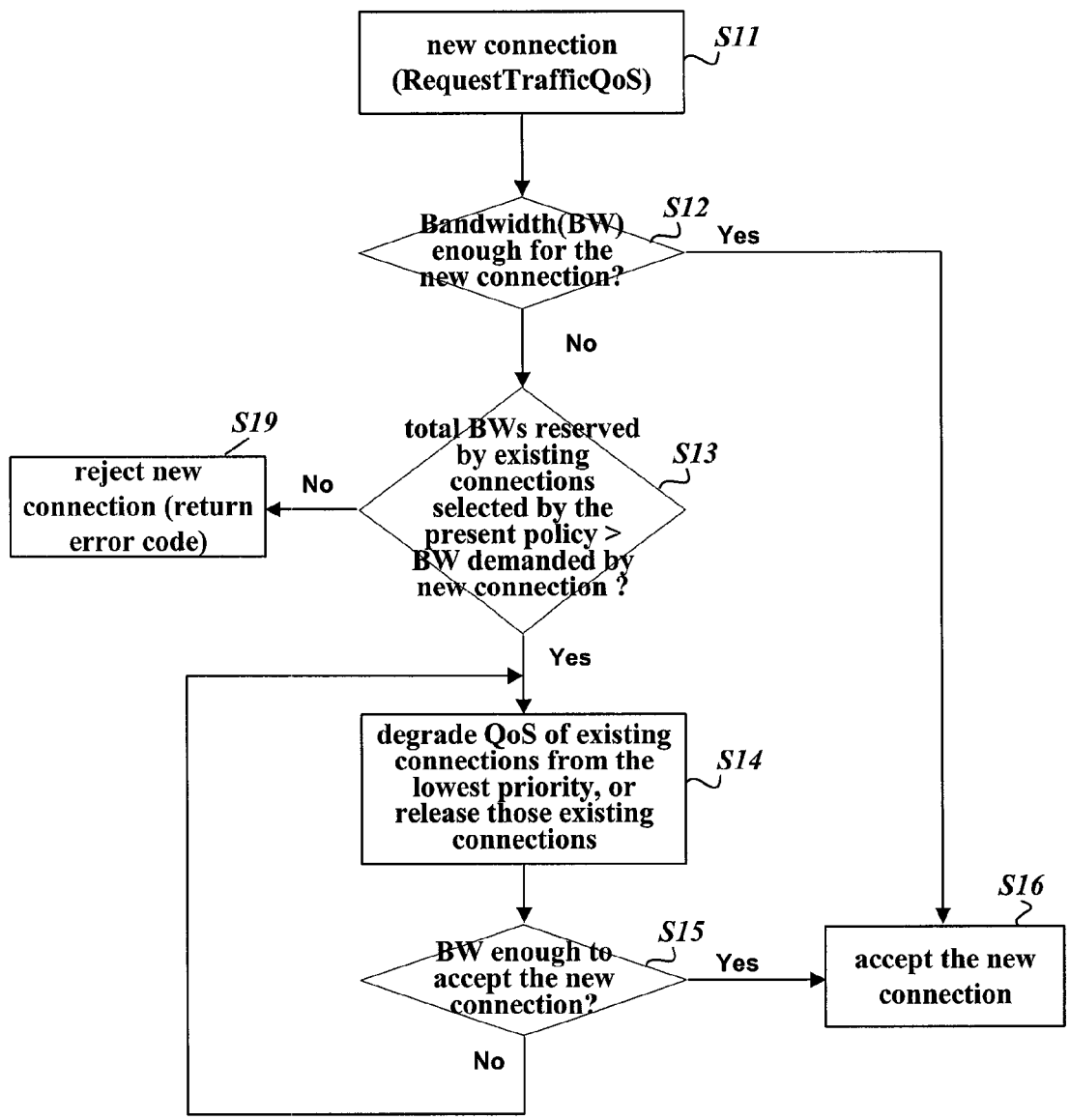

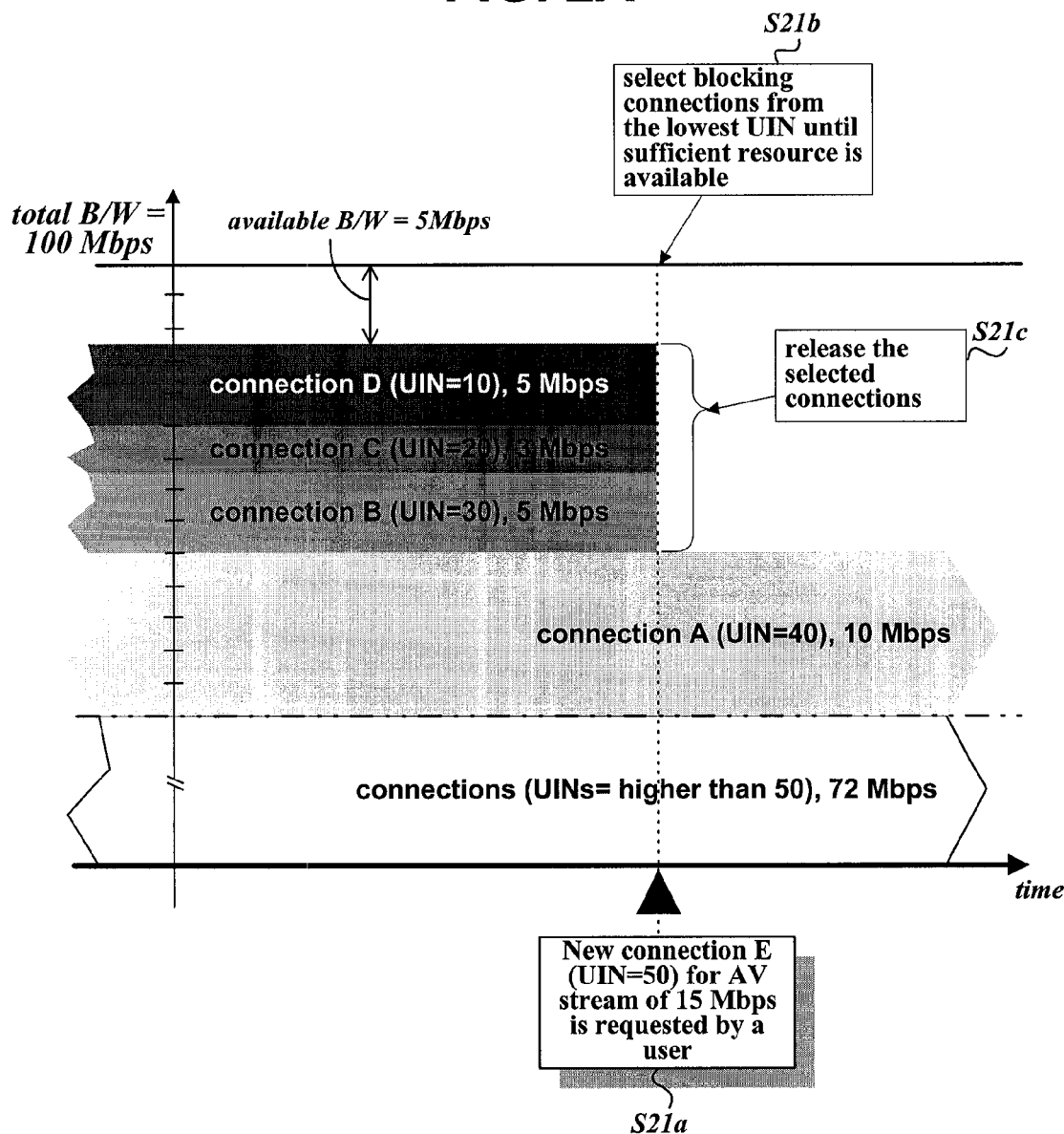

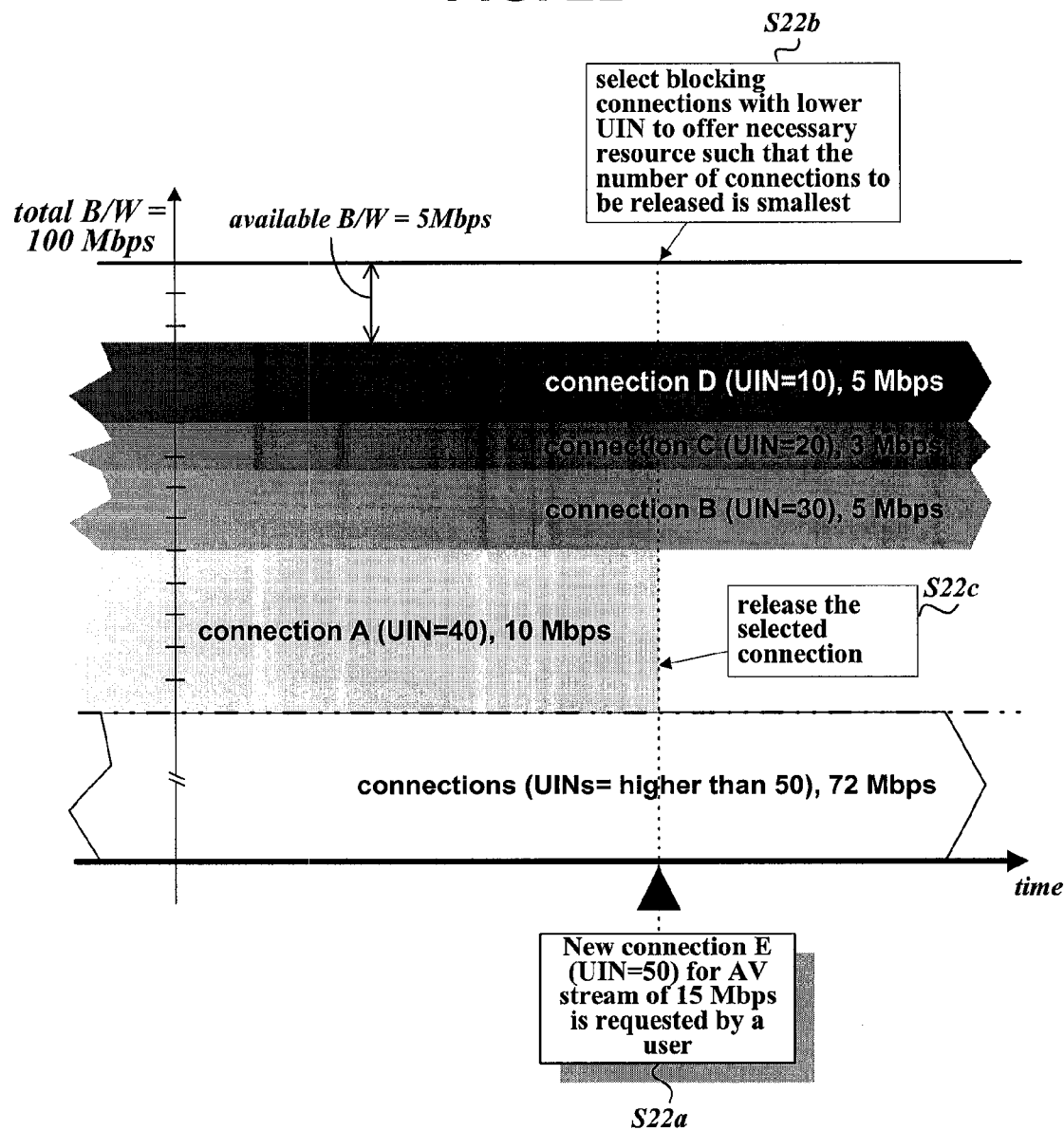

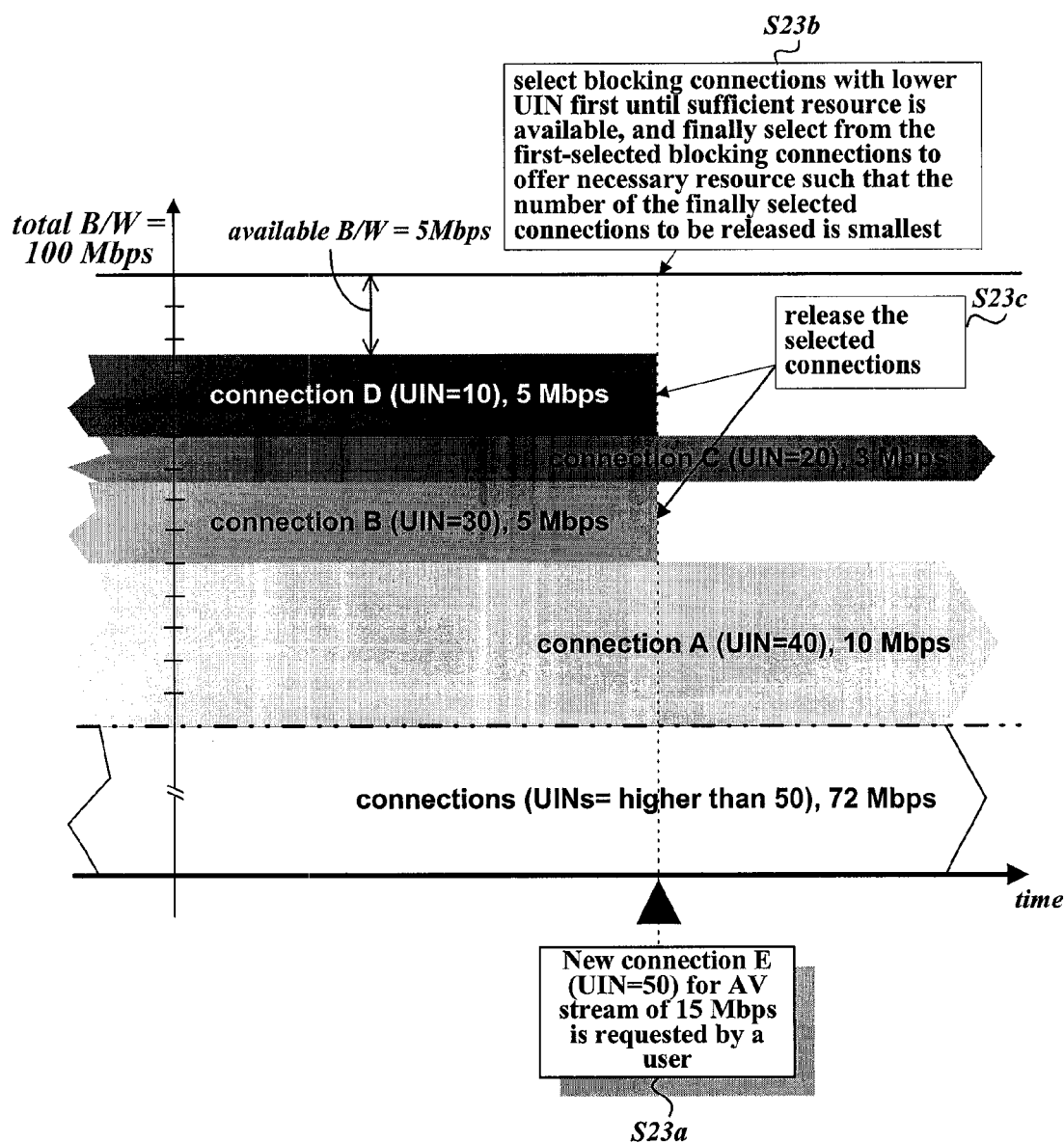

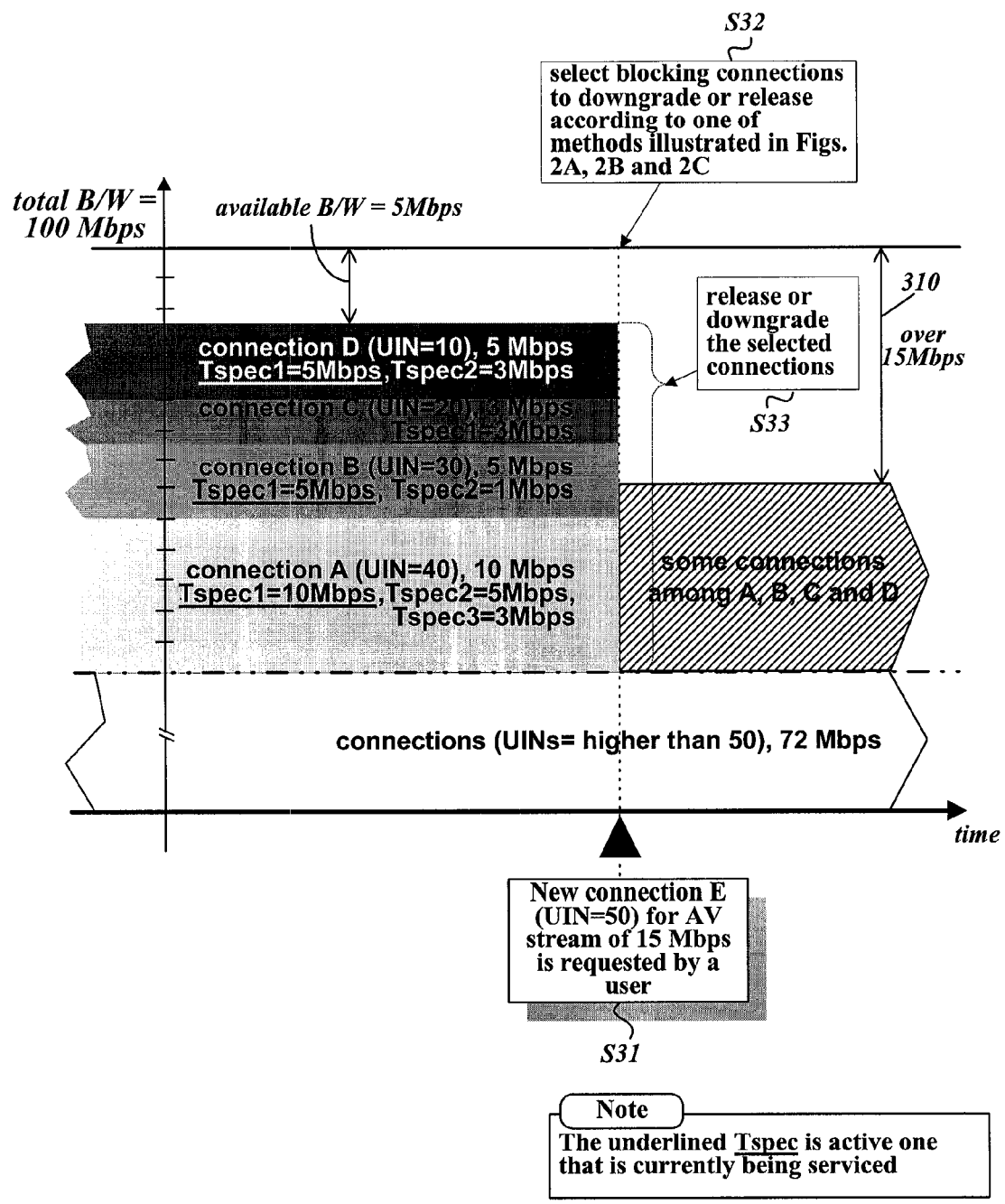

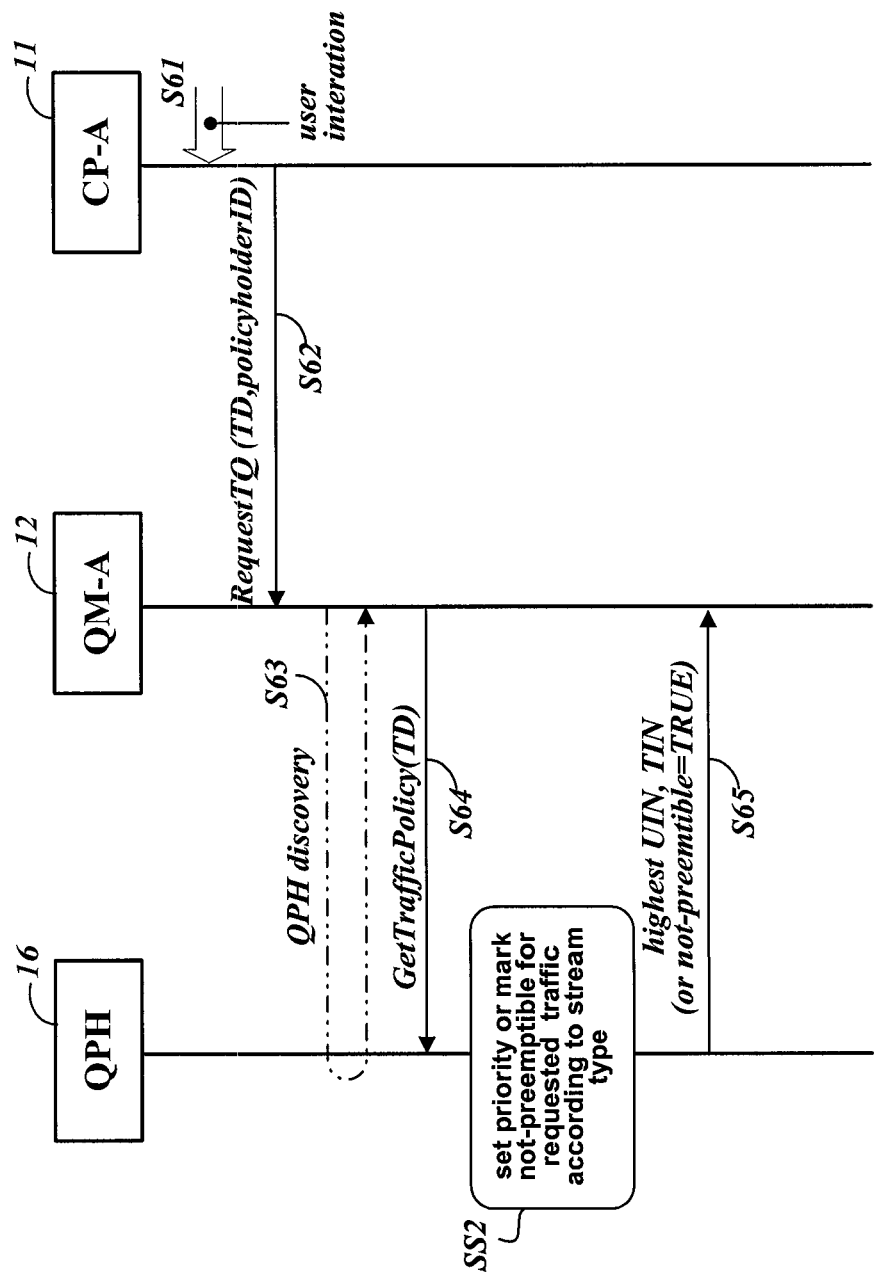

METHOD FOR MANAGING DATA TRANSFER SERVICES ON A NETWORK

CROSS-REFERENCE TO RELATED APPLICATIONS

This application is the National Stage filing under 35 U.S.C. 371 of International Application No. PCT/KR2007/002043, filed on Apr. 26, 2007, which claims the benefit of U.S. Provisional Application Ser. No. 60/795,524, filed on Apr. 26, 2006.

1. TECHNICAL FIELD

The present invention is related to technology for managing content transfer services through a home network such as the one based on UPnP.

2. BACKGROUND ART

Recently, inexpensive and pervasive networking technologies based on various small devices are emerging or being commercialized. People can make good use of various home appliances such as refrigerators, TVs, washing machines, PCs, and audio equipments once such appliances are connected to a home network. For the purpose of such home networking, UPnP™ (hereinafter, it is referred to as UPnP for short) specifications have been proposed.

A UPnP network consists of a plurality of UPnP devices, services, and control points. A service on a UPnP network represents a smallest control unit on the network, which is modeled by state variables. A CP (Control Point) on a UPnP network represents a control application equipped with functions for detecting and controlling other devices and/or services. A CP can be operated on an arbitrary device which is a physical device such as a PDA providing a user with a convenient interface. A CP can also constitute a single device together with another service, e.g., a renderer service which expresses images by rendering media data. Therefore, multiple CPs can exist on a UPnP network and the user can control operations on a desired service by choosing a convenient CP depending on his or her current location or employed device.

Once a home network as above is built in a particular place such as a home, the user can conveniently make use of desired operations (e.g., operations of duplicating or transferring data between separate devices) irrespective of his/her current location; moreover, multiple users can share the same device at the same time, in the same place.

As described above, when multiple users use networked devices simultaneously or sequentially, or multiple tasks are carried out on networked devices simultaneously or sequentially, required quantity of data transmission may exceed transmission bandwidth provided by a network. In this case, network access for data transmission should be restricted.

For example, when additional network access is requested and bandwidth required by the request cannot be provided by a current network while multiple content data are being streamed through the network, a management method appropriate for content transfer services is needed, which either rejects the request or retrieves bandwidth occupied by a current streaming connection to accommodate additional network access and allocates the bandwidth to the additional network access.

3. DISCLOSURE OF THE INVENTION

One objective of the present invention is to provide a method for managing traffic transfer services, the method, when available bandwidth is not sufficient for a new connection, retrieving resources for transfer service of the content being serviced in an optimal way and allocating the resources to a new connection.

Another objective of the present invention is to provide a method for managing traffic transfer services, the method, in the case of unusual transfer service, sustaining current transfer resources even when shortage of network resources occurs due to the request of a new connection.

One method for managing traffic transfer services on a network according to the present invention, if current bandwidth available is not sufficient for a new connection, determines priority reference used to retrieve bandwidth greater than necessary bandwidth and selects a combination of connections whose priority is not higher than the determined priority reference such that the selected combination returns the necessary bandwidth and the number of connections in the selected combination is smallest as well. The connections pertaining to the selected combination are pre-empted to permit access of the new connection to the network.

In one embodiment according to the present invention, the priority reference is determined from a UIN (User Importance Number) value assigned to a connection.

In one embodiment according to the present invention, among servicing connections having lower priority than that of the new connection, connections are selected beginning from a connection of the lowest priority up to the one until bandwidth more than needed is ensured and the priority reference is determined as a value corresponding to the highest priority among the selected connections.

In another embodiment according to the present invention, the highest priority among those of servicing connections having lower priority than that of the new connection is determined as the priority reference.

In one embodiment according to the present invention, in selecting connections to be pre-empted, those connections specified as 'not-preemptible' are excluded from consideration for selection.

Another method for managing traffic transfer services on a network according to the present invention, if current bandwidth available is not sufficient for a new connection, determines priority reference ensuring to retrieve bandwidth greater than necessary bandwidth by degrading service quality and among connections having priorities lower than the priority reference, degrades service quality of a smallest number of connections being able to return greater than the necessary bandwidth by degrading service quality. The newly acquired bandwidth is used to accommodate access of the new connection to the network.

Yet another method for managing traffic transfer services on a network according to the present invention, if a request for inquiry of priority information about a new connection is received along with traffic description information, based on data type recorded in the received traffic description information and transferred through the new connection, specifies the new connection so that pre-emption or degradation of service quality thereof should not occur after allowance of access to the network. In one embodiment according to the present invention, information specifying denial of pre-emption or degradation of service quality after allowance of access to the network is recorded in the received traffic description information and returned to a device which has requested the inquiry.

In one embodiment according to the present invention, a value corresponding to the highest priority is assigned to the new connection in order to prevent pre-emption or degradation of service quality after allowance of access to the network.

In another embodiment according to the present invention, information indicating 'not-preemptible' is assigned to the new connection in order to prevent pre-emption or degradation of service quality after allowance of access to the network.

In one embodiment according to the present invention, if the data type represents an audio stream, the new connection is configured such that pre-emption or degradation of service quality thereof should not occur after allowance of access to the network In another embodiment according to the present invention, if the data type represents an emergency, the new connection is configured such that pre-emption or degradation of service quality thereof should not occur after allowance of access to the network.

4. BRIEF DESCRIPTION OF THE DRAWINGS

The accompanying drawings, which are included to provide a further understanding of the invention, illustrate the preferred embodiments of the invention, and together with the description, serve to explain the principles of the present invention. In the drawings:

FIG. 1 illustrates a flow chart of degrading service quality of the content being serviced or releasing a connection for the content according to one embodiment of the present invention;

FIGS. 2A through 2C illustrate individual methods for selecting a connection to release according to respective embodiments of the present invention;

FIG. 3 illustrates a method for selecting a connection to degrade its service quality according to another embodiment of the present invention;

Figure 4:
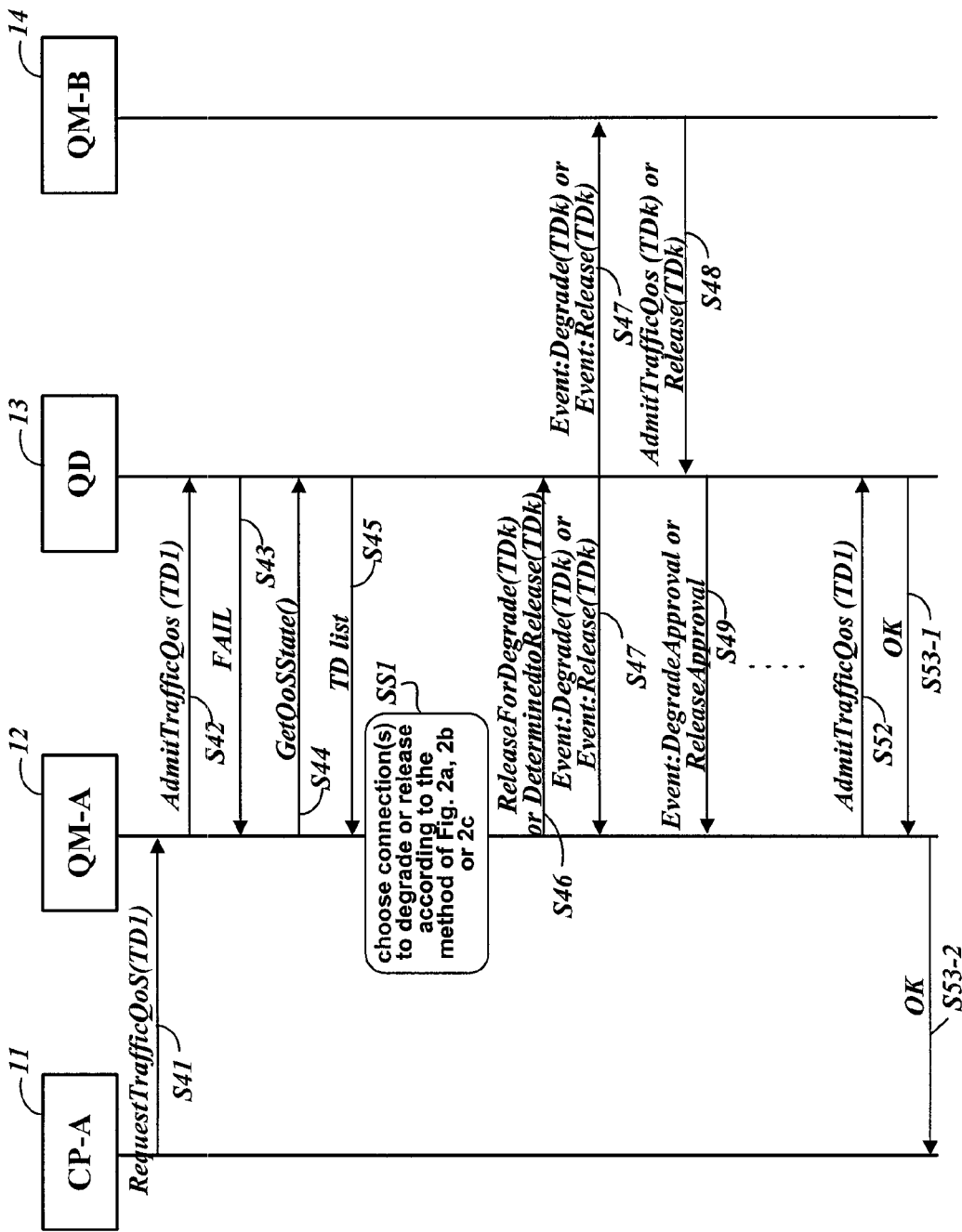

FIG. 4 illustrates a signal exchange sequence between devices for degrading service quality of the content being serviced or releasing a connection for the content according to the embodiment of FIG. 1; and FIG. 5 illustrates a signal exchange sequence between associated devices to configure a particular connection according to one embodiment of the present invention such that 'pre-emption' is not permitted for the connection.

5. BEST MODE FOR CARRYING OUT THE INVENTION

Hereinafter, according to the present invention, embodiments of a method for managing data transfer services on a network will be described in detail with reference to appended drawings.

In one embodiment according to the present invention, at the time of a request for allowance of access to a network for content data transfer, information which describes traffic conducting the transfer (which is also called as traffic descriptor and from now on, is referred to as 'TD information' for short) is delivered to a manager which processes/manages requests for allowance of access. (Hereinafter, it is referred to as 'QoS (Quality of Service) manager'.) TD information includes type of the corresponding traffic (e.g., information indicating real-time data (streaming data) or non-realtime data), information indicating applicability of change of service quality, and also information specifying conditions depending on service quality (e.g., HD (High Definition) or SD (Standard Definition)) of the corresponding traffic (which is also called as 'Tspec information'). Tspec information includes information about service rate required for streaming of traffic of particular service quality.

The above terms such as TD, Tspec, etc are not main point to the present invention and therefore can be replaced with different terms.

In the following, described is an embodiment for degrading service quality of the content being serviced or releasing a connection for content transfer according to the present invention. FIG. 1 illustrates an example regarding to the above. As shown in the figure, when a request for a new connection (a request for allowance of access to a network) is made S11, service rate of the quality specified in TD information accompanying the request (service rate specified in Tspec information which is set as active in TD information) is checked and whether the required bandwidth is available within current remaining bandwidth (unoccupied bandwidth after subtracting bandwidth reserved for streaming and so on from total available bandwidth provided by a network) is determined S12.

If the required bandwidth can be accommodated, a request for a new connection is accepted S16, otherwise service rate of a connection (or sum of service rates of connections) selected among current servicing connections after a selection policy of the present invention, which is to be described later, is compared with that of the new connection required in addition to available bandwidth S13. If the former is larger than the latter, service quality of a current servicing connection(s) is changed or the connections are released S14, otherwise the newly requested connection is rejected S19.

The aforementioned selection policy according to the present invention is described in detail. In one embodiment according to the present invention, connections are so selected that total additional bandwidth of a network secured by releasing connections of priority lower than that of a newly requested connection, starting from the one with the lowest priority among current servicing connections, can accommodate service rate required by the new connection. In one embodiment according to the present invention, the priority is determined by UIN assigned to a user who has caused the corresponding connection. For example, the higher UIN of a connection, the higher priority.

FIG. 2A specifically illustrates a method for selecting connections to release according to the selection policy of the present embodiment. In the figure, before a new connection is requested, bandwidth occupied by current servicing connections is 95 Mbps on a network of 100 Mbps bandwidth. When a new connection for streaming of AV data (connection E) is requested S21A and the new connection has TD information such that Tspec marked as active is 15 Mbps and UIN is set as 50, blocking connections having lower UIN that that of the newly requested connection (hereinafter, such blocking connections are referred to as 'inferior blocking connection'. In other words, connection A, B, C, and D are inferior blocking connections in the example of FIG. 2) are identified from currently servicing blocking connections. Among the identified inferior blocking connections, blocking connections are so selected that total additional bandwidth secured by releasing occupied bandwidth of connections starting from a connection of the lowest priority (namely, the lowest UIN) becomes larger than what the new connection requires, i.e., 15 Mbps S21B. In the example of FIG. 2A, selection is done in the order of connection D, C, and B. Since total available bandwidth that can be secured by selecting the three connections is 18 Mbps (where original bandwidth available is 5 Mbps and additional bandwidth secured due to release of three connections D, C, B is 13 Mbps), the three connections D, C, B are finally selected. Specifying UIN by the highest priority value of the three connections (UIN=30) brings the same effect as the above. Selected connections (in other words, connections having lower UIN than the specified reference) are released S21C and a newly requested connection (connection E) is accommodated. When required bandwidth cannot be secured even with selection of all of inferior blocking connections, a request for a new connection is rejected.

In another embodiment according to the present invention, among inferior blocking connections of a newly requested connection, a selection of connections that yields the smallest number of connections and at the same time ensures necessary bandwidth is accepted.

FIG. 2B specifically illustrates a method for selecting connections to release according to a selection policy of the present embodiment. Assuming the same transfer conditions as FIG. 2A, when a new connection (connection E) is requested S22A, blocking connections are selected in such a way that among inferior blocking connections in regard to the new connection (connection A, B, C, and D), the number of connections to be released are kept smallest and at the same time, total available bandwidth secured from the release is larger than what the new connection requires, namely, 15 Mbps S22B. In the example of FIG. 2B, a connection A is selected and since total available bandwidth that can be secured by the selection is 15 Mbps (where original bandwidth available is 5 Mbps and additional bandwidth secured due to the release of a connection A is 10 Mbps), connection A is finally selected. Selected connection is released S22C and a newly requested connection (connection E) is accommodated.

In a yet another embodiment according to the present invention, among inferior blocking connections of a newly requested connection, connections that can be released for securing necessary bandwidth are selected in the increasing order of priority. In the selected connections, a combination of connections is selected, where the combination provides necessary bandwidth and at the same time, the number of connections to be released is kept as small as possible.

FIG. 2C specifically illustrates a method for selecting connections to release according to a selection policy of the present embodiment. Assuming the same transfer conditions as FIG. 2A, when a new connection (connection E) is requested S23A, among inferior blocking connections in regard to the new connection (connection A, B, C, and D), a preliminary group of connections is formed, where release of the connections starting from the lowest UIN yields necessary bandwidth, namely, 15 Mbps. Blocking connections are finally selected in such a way that among the preliminary group of connections, the number of connections to be released are kept smallest and at the same time, total available bandwidth secured from the release is larger than necessary bandwidth S23B. Put another way, a lowest UIN is selected from among UINs yielding total available bandwidth larger than necessary bandwidth, the total available bandwidth being secured by choosing a particular UIN among individual UINs of current servicing connections and releasing connections with UINs lower than the particular UIN. Blocking connections are finally selected from connections of UINs lower than the selected UIN in such a way that the number of released connections is kept as small as possible and total available bandwidth secured from the release is larger than necessary bandwidth.

According to a selection scheme of the present embodiment, in the example of FIG. 2C, since connection B, C, and D can yields total available bandwidth of 18 Mbps in a preliminary selection procedure, the above connections are selected (that is, as a reference of pre-emption, UIN 30 is determined). Among the selected connections (among connections whose UIN is lower than 30, a determined pre-emption reference), a combination of connections where the number of connections to be released is smallest and total available bandwidth is still larger than necessary bandwidth—namely, connection B and D—is finally selected. Network resources for finally selected connections are pre-empted and used for a new connection. In other words, finally selected connections are released S23C and a newly requested connection (connection E) is accommodated.

As a matter of course, in the example of FIG. 2C, if UIN utilized to retrieve required network resources is the same as or higher than the UIN of a new connection, the newly requested connection is rejected.

The embodiment of the present invention described with reference to FIG. 2B utilizes the same method as described in the embodiment of FIG. 2C, where a reference for pre-emption is determined as the highest of UINs of current servicing connections and the highest UIN should be such that it is lower than UIN of a newly requested connection. From among connections whose UIN is lower than the determined UIN, the method selects connections to be released in such a way that the number of connections to be released is kept as small as possible and at the same time, network resources more than needed are secured.

In the aforementioned embodiments, current servicing connections are released to secure necessary bandwidth. Instead of releasing connections, a request for a new connection can be accommodated by degrading service quality of the content of current servicing connections. As to a method of selecting connections for degradation of service quality, one of the aforementioned embodiments is utilized.

FIG. 3 illustrates an example for the above case. When a new connection (connection E) is requested S31, since 10 Mbps is needed in addition to current available bandwidth (5 Mbps), connections are selected for degradation of service quality or release among inferior blocking connections in regard to a new connection. As for a selection method, one of the methods described earlier with reference to FIG. 2A, 2B, or 2C is used S32. Instead of securing network resources by releasing a current servicing connection, however, degrading service quality of the connection is considered for securing network resources.

For example, in the embodiment of FIG. 3, if a selection method used in FIG. 2A is adopted, connections for degradation of service quality or release are selected in an increasing order from the lowest UIN. To be more specific, as for a connection D, if current service quality is changed from Tspec1 to Tspec2, 2 Mbps is secured. As for a connection C, since there is no Tspec available after degradation, the connection is released and 3 Mbps is additionally secured. Service quality is changed from Tspec1 to Tspec 2 for a connection B and 4 Mbps is secured. Finally, as for a connection A, if service quality is changed from Tspec1 to the slowest service rate, Tspec3, 7 Mbps is secured. All in all, network resources secured are 16 Mbps and since network resources a new connection requires, 10 Mbps are met, the four connections above are selected as blocking connections. Each selected connection undergoes degradation of service quality or release thereof depending on a method adopted at the time of its selection S33.

In another embodiment according to the present invention, when change of service quality of the last connection to the quality higher than the lowest one is sufficient to secure necessary resources, the connection is so selected that service quality thereof is changed to the service quality of higher grade. In the example of FIG. 3, since changing service quality of a connection A to Tspec2 yields 5 Mbps, making total available bandwidth 14 Mbps and thus exceeding necessary bandwidth of 10 Mbps, as to the connection A, service quality is changed to Tspec2 later on.

By using the above method, since network resources amounting to a total of more than 15 Mbps are secured 310, a newly requested connection is accommodated.

In the embodiment of FIG. 3, if a selection method described with reference to FIG. 2B is applied, a smallest number of inferior blocking connections are selected for release or change of service quality, a combination of connection A and B or a combination of connection A and C is selected. In the case of a combination of connection A and B, service qualities of respective connections are changed to Tspec3 and Tspec 2, yielding network resources of 11 Mbps. As for a combination of connection A and C, service quality of connection A is changed to Tspec3 and connection C is released, yielding network resources of 10 Mbps. If a multiple number of combinations of selected connections exist, a combination which does not include a connection to be released is selected. Namely, in the above example, a combination of connection A and B is selected.

In the embodiment of FIG. 3, if a selection method described with reference to FIG. 2C is adopted, a reference UIN corresponds to 40, above which available bandwidth secured by degrading service quality starting from a connection of low priority or releasing a connection exceeds necessary bandwidth, 10 Mbps. Therefore, among blocking connections, each UIN of which is below 40 (as for a connection D, service quality is changed to Tspec2, thus yielding 2 Mbps; a connection C is released, thus yielding 3 Mbps; service quality of a connection B is changed to Tspec2, yielding 4 Mbps; and service quality of a connection A is changed to Tspec3, yielding 7 Mbps), a combination of connections comprising a smallest number of connections, which are to undergo change of service quality or release thereof, becomes the combination of connection A and B or combination of connection A and C in the same manner as above. Preferably, a combination of connection A and B, where no connection to be released is included, is selected and necessary bandwidth is secured from the combination.

FIG. 4 illustrates a signal exchange sequence between devices for degrading service quality of the content of inferior blocking connections being serviced or releasing the connections according to one embodiment of the present invention.

The procedure illustrated in FIG. 4 describes only a specific application of a signal exchange method between various devices for degrading service quality of content or releasing a connection; principles and purpose of the present invention are not limited to the illustrated procedure in FIG. 4. Therefore, inventions employing different signal exchange methods but utilizing principles and purpose suggested in the description of the present invention should necessarily be considered to belong to the scope of the present invention.

First, when a connection request for streaming content is made through a control point 11 from the user S41, the control point 11 configures TD information for the connection and requests the corresponding QoS manager 12 to allow connection S41. (For the purpose of explanation, a control point and a QoS manager associated with each other are distinguished by the letter A and B introduced in the figure.) The QoS manager 12 receiving the request, while providing TD information for a QoS policy holder (QPH, not shown), requests an inquiry about priority information of the requested connection. The QoS policy holder determines priority information according to a priority determination policy or algorithm set up to itself. Information such as identifying information of a user who requested access and type of traffic requested for access (e.g., whether the traffic is for A/V data or an external call in an emergency) is determined by applying the policy or algorithm of the QoS policy holder. According to the determination, e.g., TIN (Traffic Importance Number) and UIN are determined as priority information. The priority information is recorded in TD information and returned to the QoS manager 12 in response to the inquiry request. The QoS manager 12, then, loads an action with the TD information and requests allowance of access to a network from a QoS device 13, S42.

The QoS device 13 responds by reporting that a connection is not allowed when service rate required by the TD information cannot be accommodated within currently available bandwidth S43. The QoS device 13 represents a source and destination device to establish a connection, and also applies to the case of multiple devices when other devices exist on a data transmission path between the two devices; in what follows, the term of 'QoS device' should be understood as a device of the above meaning unless otherwise indicated.

When a request for allowance of access is rejected, the QoS manager 12 requests information about current servicing connections from the QoS device 13, S44 and acquires TD information about all the current servicing connections from the QoS device 13 according to the request S45. The QoS manager 12 checks priority information corresponding to each acquired TD information, namely, UIN and determines connections having UINs lower than that of a previously rejected connection as inferior blocking connections.

Among inferior blocking connections determined as above, on the assumption of releasing all, degrading service quality, or releasing when not degradable, a blocking connection or blocking connections are chosen according one of selection methods described with reference to FIGS. 2A through 2C, SS1. For each chosen connection, a procedure necessary for releasing or degrading service quality is carried out. In the following, a procedure of releasing or changing service quality of a connection (a connection, the corresponding TD information of which is TDk, where k is an integer other than one) is described.

The QoS manager 12 requests an action for requesting degrading service quality of one (k) of the chosen connections (ReleaseForDegrade( )) or an action for determining release of a connection (DeterminedtoRelease( )) from the QoS device 13 along with TD information (TDk) of the connection S46. The QoS manager 12, in the case of degrading service quality, set Tspec for degraded service as active in the corresponding TD information. The QoS manager 12 loads the TD information in the request action and thus provides the TD information. When the request S46 occurs, the QoS device 13 generates an event for degrading service quality (Event:Degrade) or an event for releasing a connection (Event:Release) according to a received action S47. At this time, TD information (TDk) of a connection requested for degrading service quality or release thereof is loaded into the event and thus delivered together. The event is delivered to a QoS manager 12, 14 subscribed already to the corresponding event. (In the embodiment of the present invention, it is assumed that all the QoS managers have subscribed to the corresponding events.)

All the QoS managers 12, 14 which received the event determines whether a connection in question where the event occurred corresponds to the servicing connection requested by itself for access; the event is ignored when the connection is not the one that the QoS managers 12, 14 requested for access. In the embodiment of FIG. 4, a QoS manager 14 in group B is assumed to be the requester for the connection (k); therefore, a QoS manager 12 in group A ignores the event.

The QoS manager 14 in group B, in the case of degrading service quality, invokes an action for allowance of access (AdmitTrafficQoS( )) on the QoS device 13 for reconfiguration of a connection by using received TD information. In the case of releasing a connection, a release action is invoked (Release( )) S48. The QoS device 13, then, either serves the corresponding connection (k) with a service rate according to a low service quality or stops serving the connection and retrieves resources allocated thereto. An event notifying of completion of requested degrading service quality or release of a connection (Event:DegradeApproval or Event:ReleaseApproval) is then generated S49. In another embodiment of the present invention, instead of an event notifying of completion of degrading service quality or release of a connection, a response to a previous action for degrading service quality (ReleaseForDegrade ( )) or an action for determining release of a connection (DeterminedtoRelease( )) can notify that degrading service quality or release of a connection has been successfully completed. As for the event (Event:DegradeApproval or Event:ReleaseApproval), with the QoS manager 12 subscribing at an appropriate time, e.g., at the moment of requesting an action for degrading service quality or determining release of a connection is invoked S46, only the manager which has requested degrading service quality or determining release of a connection (only the QoS manager 12 of group A in the example of FIG. 4) can receive the event.

After release of a connection or degrading service quality as above is carried out against all the inferior blocking connections selected previously, the QoS manager 12 requests again allowance of access from the QoS device 13 by using TD information (TD1) of a connection whose previous request for allowance of access has been rejected (S32). The QoS device 13, when service rate required by activated Tspec of TD information (TD1) accompanying a received request for access can be accommodated, provides a response admitting the access (S53-1). The response is relayed S53-2 to the corresponding control point 11 as a response to the previous action for requesting traffic (RequestTrafficQoS( )) S41.

In the above embodiments, a connection created by a user with a high priority can release a connection with a priority lower than that and can thus utilize network resources. The above implies that a connection created by a user with a low priority, while being in service, can be stopped due to access to network resources by others. However, it may be the case that service for some connection should not be stopped depending on the type of the content being transferred, even though the priority of the connection is low. Therefore, in one embodiment according to the present invention, in determining a connection for release or degrading service quality, a connection regarded to be urgent is not determined for release or degrading service quality. In the following, more specific description is given with reference to FIG. 5.

When the user issues S61 a request for connection (connection X) of traffic for transferring between devices or streaming through a control point 11, the control point 11 configures TD information for the connection according to the user input or selection information through an appropriate UI (User Interface) and invokes S62 an action for requesting allowance of connection on a QoS manager 12. As described above, the configured TD information includes type of traffic data requested for access (real-time AV stream, real-time audio stream, file transfer data, or emergency data), identifying information of the user (e.g., user name) and the like. The control point 11 also includes, in the input argument of an action requesting allowance of connection, identifying information (policyholderID) of QoS policy holder (QPH) which determines priority of requested access.

The QoS manager 12, which received the action for requesting allowance of the connection, checks QoS policy holder identifying information (policyholderID) within input argument information of the action. The QoS manager 12, while providing received TD information for QOS policy holder 16 corresponding to the checked identifier, requests an inquiry about priority information according to a previously set traffic policy S64. Before invoking the action, the QoS manager 12 may carry out an operation for discovering all the QoS policy holders to identify a correct QoS policy holder corresponding to identifying information of a QoS policy holder within the input argument S63.

The QoS policy holder 16 which received the inquiry request, assigns the highest priority, namely, the largest UIN to the connection (connection X) so that the connection should not be pre-empted, namely, released or degraded, by other succeeding connection requests according to the type of traffic data contained in TD information SS2. In this case, a UIN, configured to be assigned to the user of a connection requested for connection allowance, is ignored and instead, the highest UIN is recorded in TD information to be returned. For example, when the type of traffic data is real-time audio data, a UIN configured to be assigned to the user is ignored for the connection and the highest UIN is assigned. If the control point 11 configures TD information to request connection allowance and records information such as 'emergency' as the type of traffic data, the QoS policy holder 16 ignores UIN configured to be assigned to the corresponding user and assigned the highest UIN.

In another embodiment according to the present invention, instead of assigning the highest value to UIN, UINs are assigned to the corresponding connections according to already set UIN assignment policy. Aside from UIN, 'not-preemptible' flag is set in TD information to be returned to the QoS manager 12.

When information about priority inquired by the above method is determined, TIN and UIN (in another embodiment according to the present invention, 'not-preemptible' flag is added) are loaded to TD information and returned S65 to the QoS manager 12 in response to the inquiry request S64.

In this way, when information related to priority is received, the QoS manager 12 requests allowance of access to a network from a QoS device. The QoS device, if it cannot accommodate a service rate required by the TD information within currently available bandwidth, returns a FAIL response implying disapproval of an access request, otherwise returns an OK response. Upon permission, data requested by the user are transferred through the connection (connection X).

Similar to one embodiment described above, in the case of a connection receiving the highest UIN according to the data type of a connection, the connection is not considered as an inferior blocking connection with respect to other succeeding connections even by the methods of respective embodiments described with reference to FIGS. 2A through 2C. Therefore, data transfer is not stopped by allowance request of other connections.

Similar to a yet another embodiment described above, when a 'not-preemptible' flag is set according to the data type of a connection, embodiments described with reference to FIGS. 2A through 2C, when a new connection is requested and network resources required by the connection is not available, in selecting inferior blocking connections with respect to the connection, those connections where 'not-preemptible' flag is set are excluded irrespective of the values of UINs of the connections but inferior blocking connections are selected among connections where 'not-preemptible' flag has been reset (FALSE). Connections for release or degrading service quality are selected among the selected connections according to one of methods described with reference to FIGS. 2A through 2C. For example, in the example of FIG. 2A, if connection C is the one where 'not-preemptible' flag is set, the connection is excluded from consideration for selection even if the connection has UIN lower than that of a newly requested connection (connection E), whereas connection B and D are selected as the connections to be released.

At least one embodiment of the present invention described through a limited number of embodiments above enables systematic use of network resources by data service through a network, e.g., releasing streaming service or changing service quality of the content in an appropriate way, thus allowing other transfer services of higher priority. In the case of releasing or degrading existing transfer services for another transfer service, too, the associated effect is kept as low as possible. In the case of a urgent service, no associated effect is allowed to appear, thus enabling effective use of network resources.

The foregoing description of a preferred embodiment of the present invention has been presented for purposes of illustration. Thus, those skilled in the art may utilize the invention and various embodiments with improvements, modifications, substitutions, or additions within the spirit and scope of the invention as defined by the following appended claims.

The invention claimed is:

1. A method for managing traffic transfer services in a network, the method performed by a Quality of Service (QoS) manager, the method comprising:
    transmitting, by the QoS manager to a QoS device transmitting data, a traffic admit request for setting up a new traffic stream, wherein the traffic admit request comprises first traffic descriptor (TD) information for the new traffic stream;
    receiving, from the QoS device, a blocking traffic stream list representing at least one blocking traffic stream, when the new traffic stream is determined not to be admitted by the QoS device due to a lack of resources being used, wherein each of the at least one blocking traffic stream corresponds to second TD information, and each of the second TD information includes an available data rate list for the at least one blocking traffic stream and an active index indicating a specific data rate used for the blocking traffic stream among the available data rate list;
    obtaining, by the QoS manager, the priority information of the new traffic stream;
    transmitting, by the QoS manager to a policy holder, a traffic policy request requesting priority information for each of the blocking traffic stream after the new traffic stream is determined not to be admitted by the QoS device;
    receiving, from the policy holder, a traffic policy response including priority information for each of the blocking traffic stream;
    determining, by the QoS manager, a candidate traffic stream for degrading among at least one blocking traffic stream, the candidate traffic stream having lower priority information than the priority information of the new traffic stream,
    selecting at least one blocking traffic stream among the candidate traffic stream considering the second TD information corresponding to the at least one blocking traffic stream, wherein the selected at least one blocking traffic stream includes a lower available data rate than the specific data rate indicated by the active index in the available data rate list; and
    instructing the QoS device to degrade the selected at least one blocking traffic stream among the candidate traffic stream considering necessary bandwidth to admit the new traffic stream.

2. The method of claim 1, wherein the priority information is a User Importance Number (UIN).

3. The method of claim 1, wherein the selecting further includes selecting a smallest number of the blocking traffic steam to be degraded to yield the necessary bandwidth.

4. The method of claim 1, wherein the at least one blocking traffic stream is selected from a blocking traffic stream having the lowest priority information upward until the necessary bandwidth becomes available.

5. A QoS manager comprising:
    an interface unit; and
    a processor configured to:
        transmit, via the interface unit, to a QoS device transmitting data, a traffic admit request for setting up a new traffic stream, wherein the traffic admit request comprises first traffic descriptor (TD) information for the new traffic stream;
        receive, via the interface unit from the QoS device, a blocking traffic stream list representing at least one blocking traffic stream, when the new traffic stream is determined not to be admitted by the QoS device due to a lack of resources, wherein each of the at least one blocking traffic stream corresponds to second TD information, and each of the second TD information includes an available data rate list for the at least one blocking traffic stream and an active index indicating a specific data rate used for the blocking traffic stream among the available data rate list;
        obtain the priority information of the new traffic stream;
        transmit, to a policy holder, a traffic policy request requesting priority information for each of the blocking traffic stream after the new traffic stream is determined not to be admitted by the QoS device;
        receive, from the policy holder, a traffic policy response including priority information for each of the blocking traffic stream;
        determine a candidate traffic stream for degrading among at least one blocking traffic stream, the candidate traffic stream having lower priority information than the priority information of the new traffic stream;
        select at least one blocking traffic stream among the candidate traffic stream considering the second TD information corresponding to the at least one blocking traffic stream, wherein the selected at least one blocking traffic stream includes a lower available data rate than the specific data rate indicated by the active index in the available data rate list; and
        instruct the QoS device to degrade the selected at least one blocking traffic stream among the candidate traffic stream considering necessary bandwidth to admit the new traffic stream.

6. The QoS manager of claim 5, wherein the priority information is a User Importance Number (UIN).

7. The QoS manager of claim 5, wherein the selecting further includes selecting a smallest number of the blocking traffic steam to be degraded to yield the necessary bandwidth.

8. The QoS manager of claim 5, wherein the at least one blocking traffic stream is selected from a blocking traffic stream having the lowest priority information upward until the necessary bandwidth becomes available.

* * * * *